(12) United States Patent
Esteves et al.

(10) Patent No.: US 8,520,650 B2
(45) Date of Patent: Aug. 27, 2013

(54) METHODS AND APPARATUS FOR OFDM PEER DISCOVERY

(75) Inventors: Eduardo S. Esteves, San Diego, CA (US); Junyi Li, Chester, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/177,037

(22) Filed: Jul. 6, 2011

(65) Prior Publication Data

US 2013/0010661 A1    Jan. 10, 2013

(51) Int. Cl.
*H04Q 7/24* (2006.01)

(52) U.S. Cl.
USPC .......................................... 370/338; 370/210

(58) Field of Classification Search
None
See application file for complete search history.

(56) References Cited

U.S. PATENT DOCUMENTS

| | | | |
|---|---|---|---|
| 7,388,845 B2 | 6/2008 | Laroia et al. | |
| 8,085,711 B2 * | 12/2011 | Soong et al. | 370/328 |
| 2005/0111383 A1 | 5/2005 | Grob et al. | |
| 2006/0039450 A1 | 2/2006 | Fulton et al. | |
| 2007/0206554 A1 | 9/2007 | Laroia et al. | |
| 2007/0211678 A1 * | 9/2007 | Li et al. | 370/338 |
| 2008/0031220 A1 | 2/2008 | Li et al. | |
| 2010/0310004 A1 * | 12/2010 | Li et al. | 375/295 |
| 2010/0317291 A1 * | 12/2010 | Richardson | 455/63.1 |
| 2011/0066738 A1 | 3/2011 | Richardson et al. | |
| 2011/0085620 A1 | 4/2011 | Measson et al. | |

OTHER PUBLICATIONS

International Search Report and Written Opinion—PCT/US2012/045462—ISA/EPO—Nov. 7, 2012.

* cited by examiner

*Primary Examiner* — Duc C Ho
(74) *Attorney, Agent, or Firm* — James K. O'Hare

(57) ABSTRACT

A method of wireless communication includes splitting data into n data sets, where n is greater than or equal to two. In addition, the method includes selecting n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. Furthermore, the method includes sending m data sets on m selected resources in m transmissions within the one full set of transmissions, where m is less than or equal to n.

28 Claims, 15 Drawing Sheets

| Parameters | D1 | D2 | D3 | D4 | D5 |
|---|---|---|---|---|---|
| FFT | 32 | 32 | 32 | 24 | 48 |
| Coding | QPSK rate 1/2 | 8-PSK rate 1/2 | QPSK rate 1/2 | 8-PSK rate 1/2 | QPSK rate 1/2 |
| $N_B$ | 1 | 1 | 7 | 4 | 7 |
| $N_T$ | 28 | 28 | 28 | 20 | 42 |
| $N_S$ | 11 | 15 | 11 | 21 | 7 |
| Number of PDRIDs | 308 | 420 | 308 | 420 | 294 |

FIG. 12

METHODS AND APPARATUS FOR OFDM PEER DISCOVERY

BACKGROUND

1. Field

The present disclosure relates generally to communication systems, and more particularly, to orthogonal frequency-division multiplexing (OFDM) peer discovery.

2. Background

In a wireless wide area network (WWAN), all communication between wireless devices and a serving base station are through the uplink/downlink channels between the wireless devices and the serving base station. If two communicating wireless devices are in the vicinity of each other, the two wireless devices can communicate directly without going through the base station. Such direct peer-to-peer communication can enable new types of services and/or reduce the traffic load on the base station.

To enable peer-to-peer communication, wireless devices in the vicinity of each other may periodically participate in peer discovery by transmitting peer discovery signals. Methods for enabling peer discovery in WWAN systems are needed.

SUMMARY

In an aspect of the disclosure, a method of wireless communication includes splitting data into n data sets, where n is greater than or equal to two. In addition, the method includes selecting n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. Furthermore, the method includes sending m data sets on m selected resources in m transmissions within the one full set of transmissions, where m is less than or equal to n.

In an aspect of the disclosure, an apparatus for wireless communication includes means for splitting data into n data sets, where n is greater than or equal to two. The apparatus further includes means for selecting n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. The apparatus further includes means for sending m data sets on m selected resources in m transmissions within the one full set of transmissions, where m is less than or equal to n.

In an aspect of the disclosure, a computer program product includes a computer-readable medium. The computer-readable medium includes code for splitting data into n data sets, where n is greater than or equal to two. The computer-readable medium further includes code for selecting n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. The computer-readable medium further includes code for sending m data sets on m selected resources in m transmissions within the one full set of transmissions, where m is less than or equal to n.

In an aspect of the disclosure, an apparatus for wireless communication includes a processing system. The processing system is configured to split data into n data sets, where n is greater than or equal to two. The processing system is further configured to select n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. The processing system is further configured to send m data sets on m selected resources in m transmissions within the one full set of transmissions, where m being less than or equal to n.

BRIEF DESCRIPTION OF THE DRAWINGS

FIG. 12 is a table illustrating exemplary parameters for the exemplary structure of the peer discovery channel.

DETAILED DESCRIPTION

Figure 1:
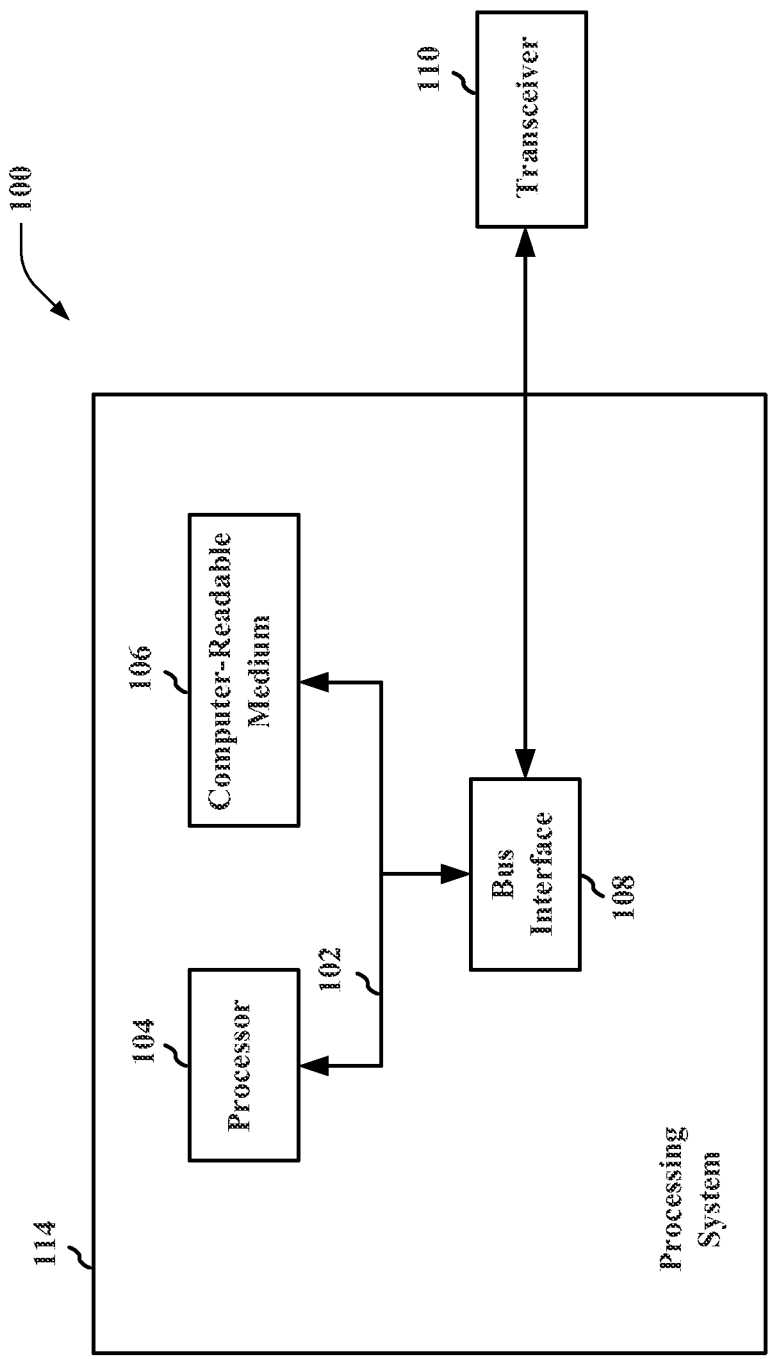
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
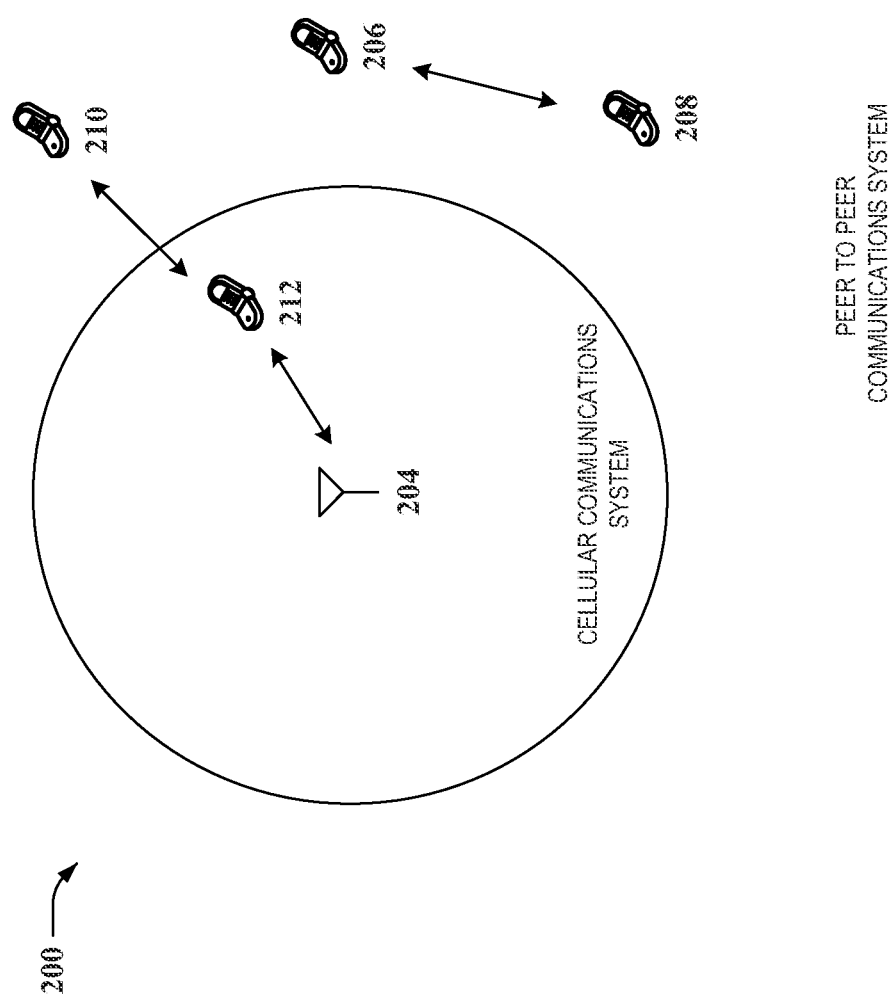
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a WWAN. Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
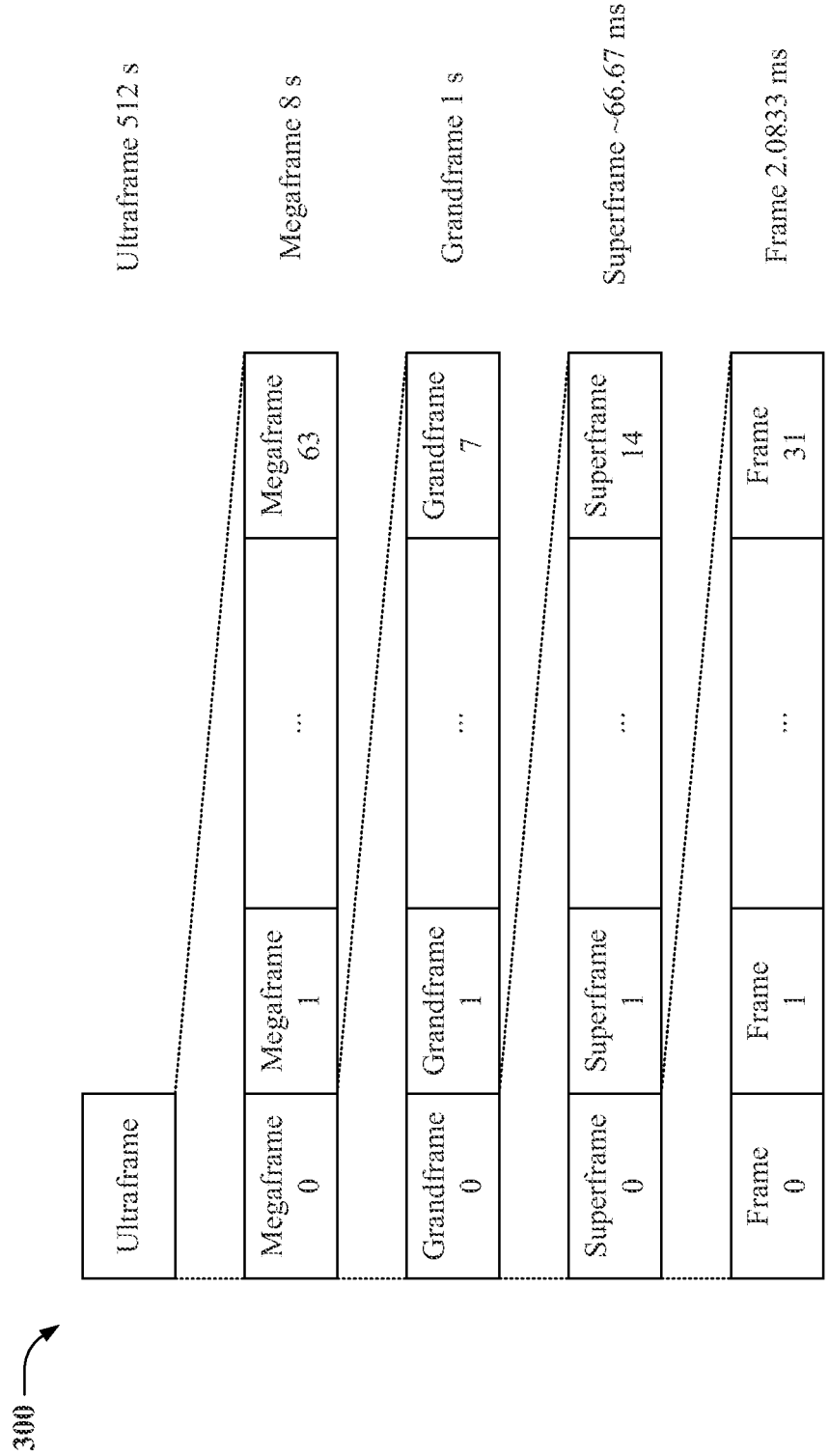
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
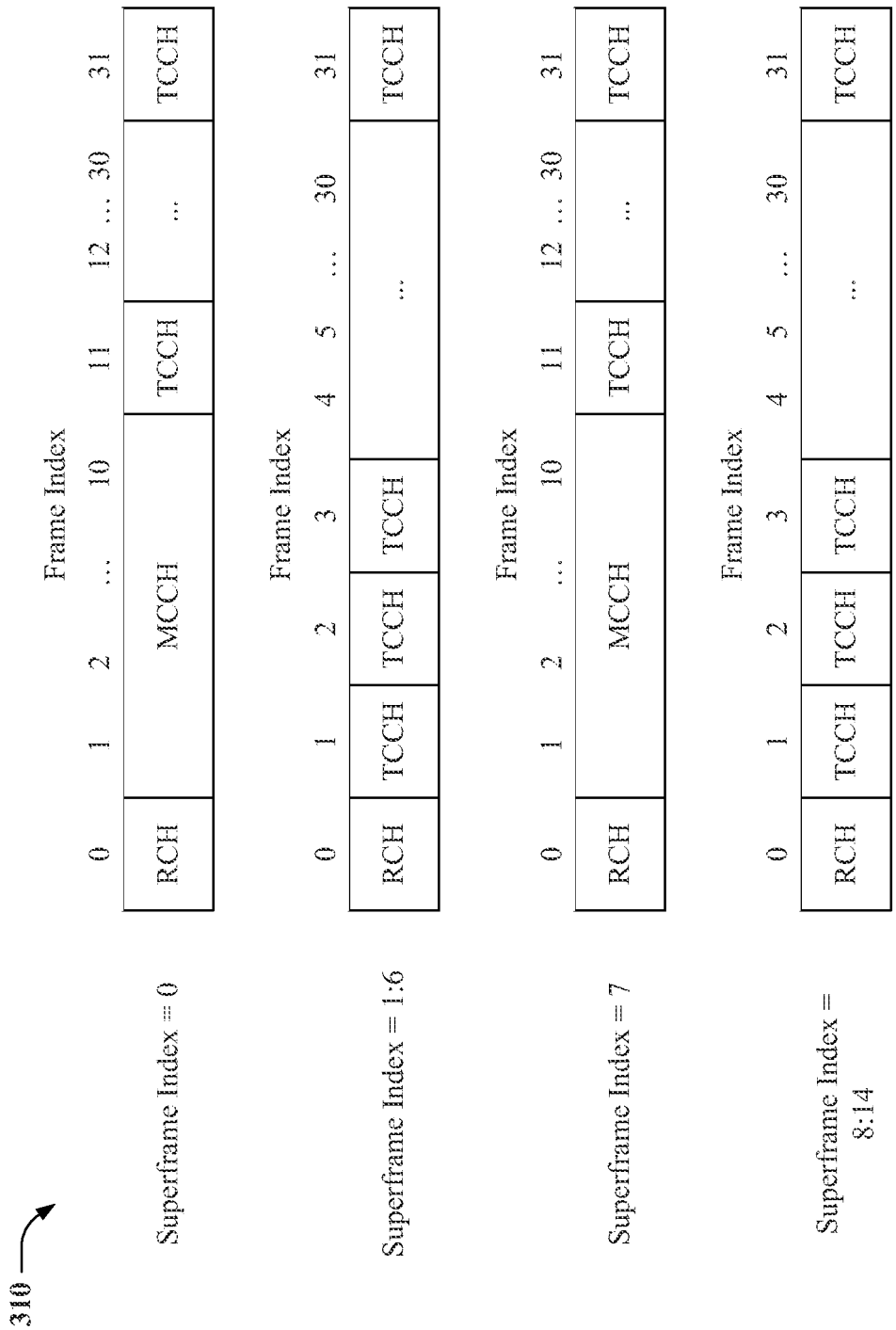
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
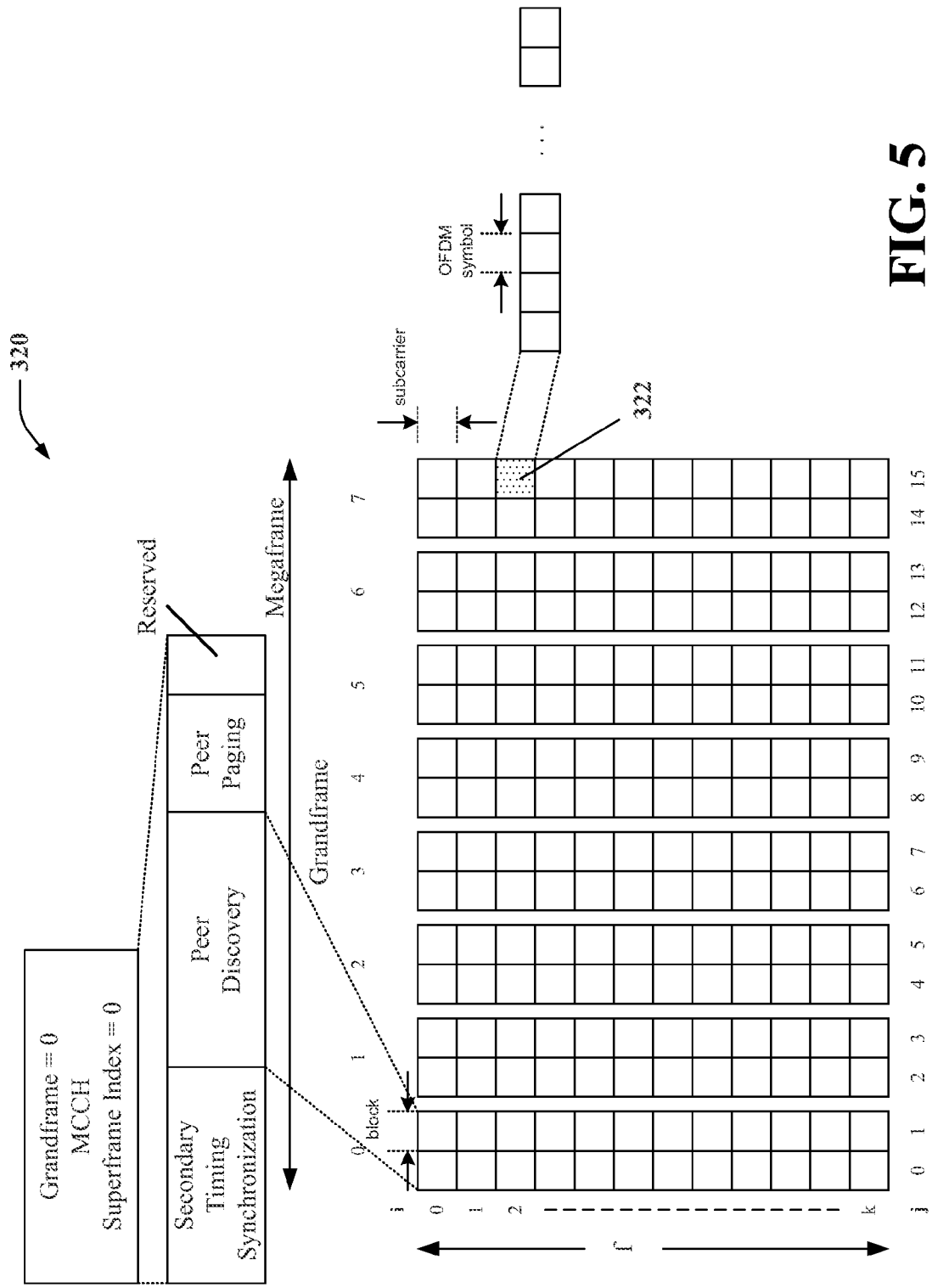
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of OFDM symbols at the same subcarrier (e.g., 72 resource elements). FIG. 5 provides an example of a subchannel (e.g., short range peer discovery channel) including blocks in one megaframe, which includes the MCCH superframe index 0 of grandframes 0 through 7. One megaframe may be considered one peer discovery burst. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices. The peer discovery signals may include unique expressions that allow users to determine to which wireless devices to form a peer-to-peer communication link.

Figure 6:
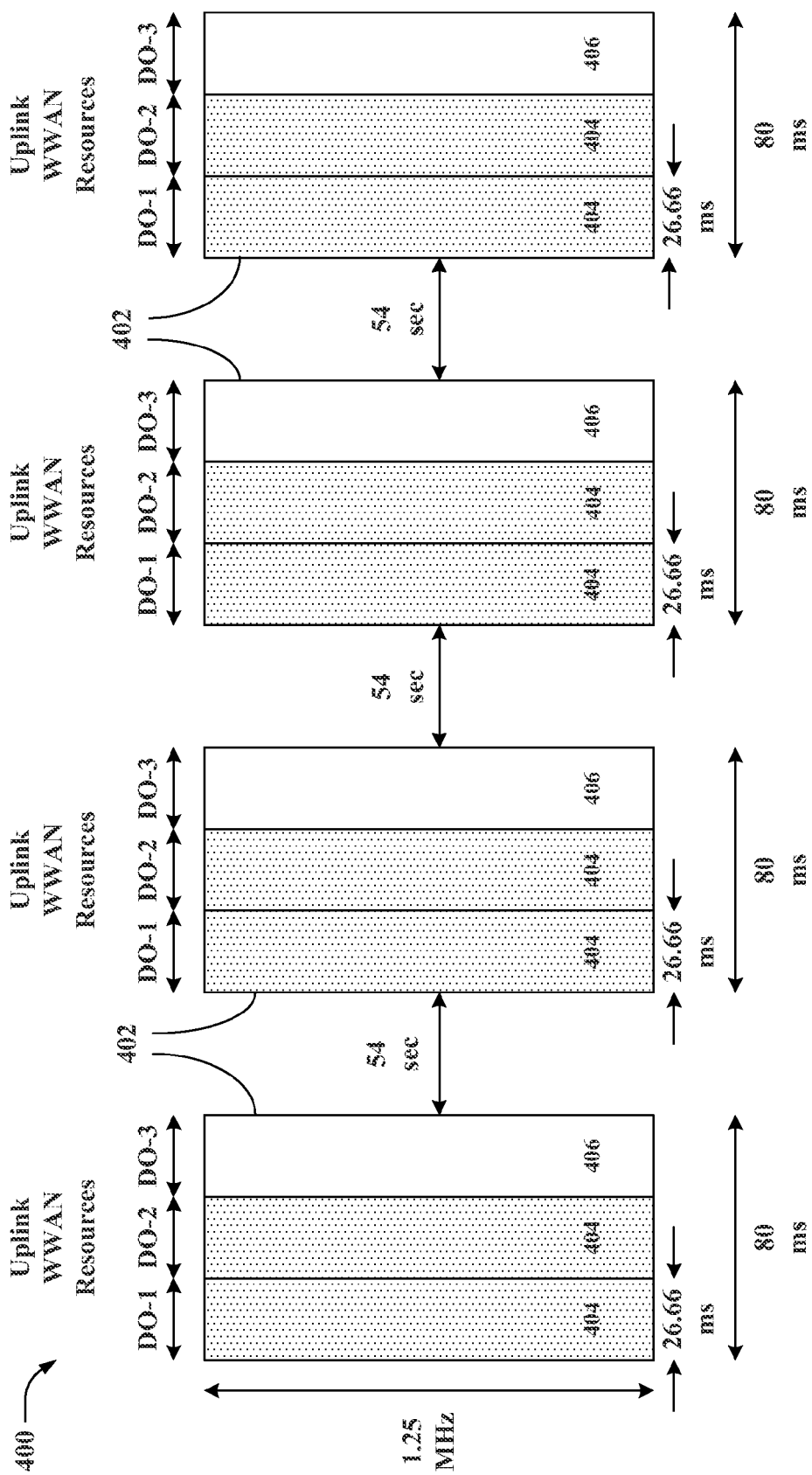
FIG. 6 is a diagram illustrating exemplary uplink WWAN resources.

FIG. 6 is a diagram 400 illustrating exemplary uplink WWAN resources. FIG. 6 illustrates uplink WWAN resources for an evolution data optimized/only (EV-DO) system, and particularly an EV-DO silence interval within a CDMA2000 system, but the exemplary methods are applicable to other systems as well, such as systems with predefined silent periods on either uplink or downlink and time division multiple access (TDMA) based systems such as Global System for Mobile Communications (GSM), Long Term Evolution (LTE) Time Division Duplex (TDD), Personal Handy-phone System (PHS), Personal Digital Cellular (PDC), Digital Enhanced Cordless Telecommunications (DECT), and IS-54/IS-136 (known as Digital AMPS (D-AMPS)). For example, the exemplary methods may be utilized in particular time slots in GMS or LTE TDD systems. EV-DO (previously known as 1xEV-DO) is a telecommunications standard for the wireless transmission of data through radio signals. EV-DO is part of the CDMA2000 family of standards. EV-DO uses multiplexing techniques such as CDMA and time division multiple access (TDMA) to maximize both individual users' throughput and the overall system throughput. An EV-DO channel has a bandwidth of 1.25 MHz. In an EV-DO system, every 54 seconds there is an 80 ms silence interval in which the EV-DO devices are required to stop transmitting in the uplink to allow the base station to measure the power of the background interference and noise. The periodic (or repetitive) 80 ms silence interval 402 includes three consecutive frames, each of which is approximately 26.66 ms (i.e., 80/3 ms). In an exemplary method, the base station allocates the silence interval 402 for peer discovery, and therefore allows wireless devices to utilize the silence interval 402 for peer discovery. In order to avoid causing interference to WWAN communication within a WWAN, wireless devices may utilize the silence interval 402 for peer discovery rather than sets of resources allocated every 8 seconds in each megaframe as discussed in FIG. 5.

In one configuration, the base station utilizes one or more frames of the silence interval to measure background interference and noise. For example, the base station may utilize frames 404 of the silence intervals 402. As such, the EV-DO silence interval 402 may include a first subset of resources 404 and a second subset of resources 406. The first subset of resources 404 are utilized by the serving base station to measure noise and the second subset of resources 406 are unutilized by the base station to measure noise and are allocated to wireless devices for peer discovery. As such, wireless devices that use the allocated EV-DO silence interval resources for peer discovery may utilize the resources 406.

Figure 7:
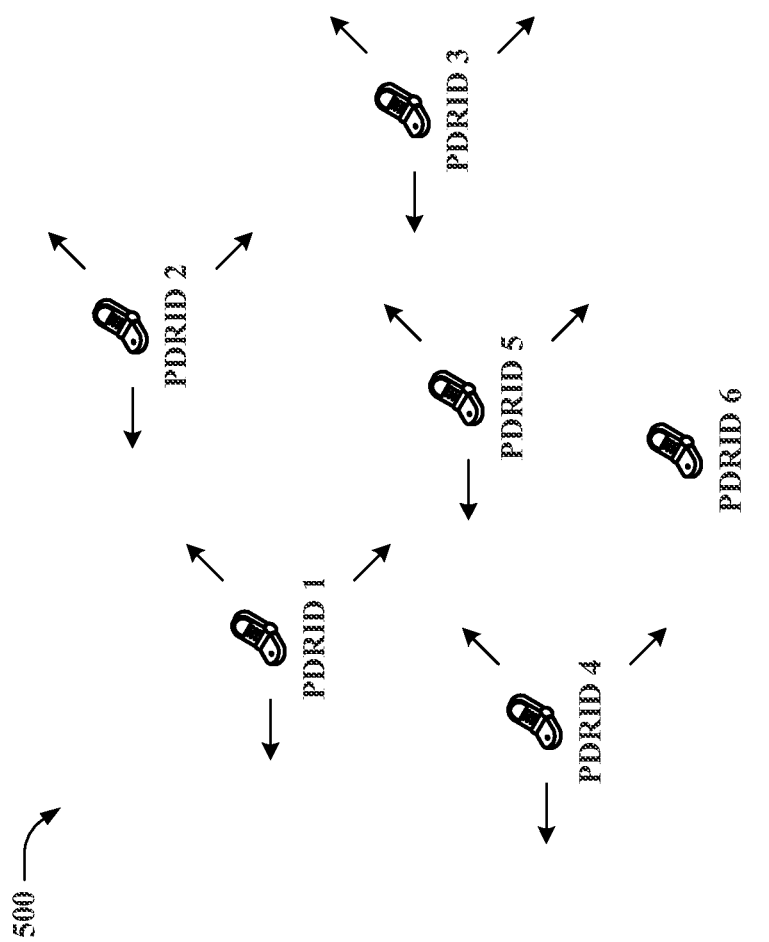
FIG. 7 is a diagram illustrating a plurality of wireless devices.

FIG. 7 is a diagram 500 illustrating a plurality of wireless devices. A half duplex system allows for receiving and sending communication, but only one at a time. As such, wireless devices operating under a half duplex constraint may receive communication and send communication, but may not send communication while they are receiving communication and may not receive communication while they are sending communication. As shown in FIG. 7, wireless devices associated with the PDRIDs 1 through 5 are transmitting their peer discovery signals concurrently. The wireless device associated with the PDRID 6 is not transmitting its peer discovery signal. Due to the half duplex nature of the wireless devices, the wireless devices associated with the PDRIDs 1 through 5 are not able to discover each other, while the wireless device associated with the PDRID 6 is able to discover the wireless devices associated with the PDRIDs 1 through 5.

Figure 8:
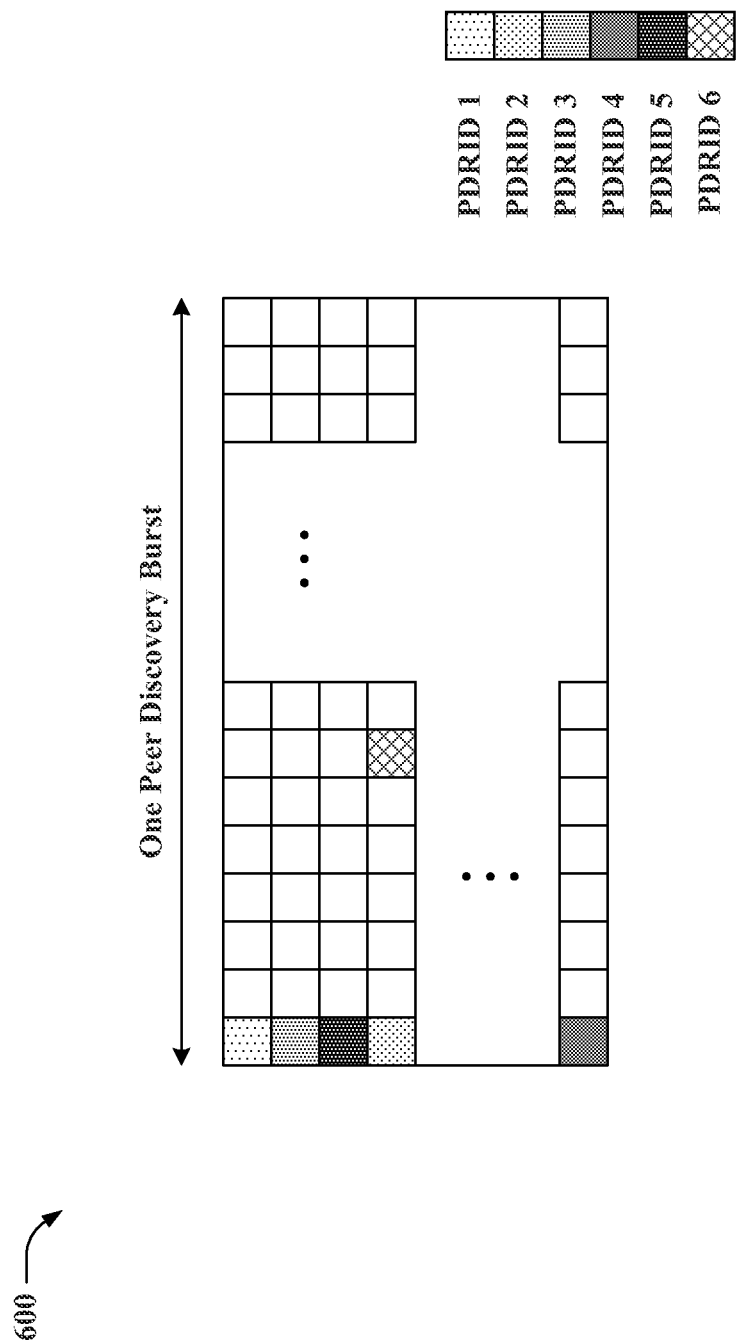
FIG. 8 is a diagram illustrating the structure of the peer discovery channel as discussed in relation to FIG. 5.

FIG. 8 is a diagram illustrating the structure of the peer discovery channel as discussed in relation to FIG. 5. One peer discovery burst includes all of the peer discovery resources in the megaframe and allocates one peer discovery transmission per wireless device. For this particular peer discovery burst, wireless devices associated with the PDRIDs 1 through 5 are allocated concurrent resources for their peer discovery. As such, those wireless devices will not be able to discover each other in the particular peer discovery burst, as they will not be able to receive peer discovery signals concurrently while transmitting peer discovery signals due to the half duplex constraint. As discussed supra, allocated resources may hop around in each of the peer discovery bursts, and therefore the wireless devices associated with the PDRIDs 1 through 5 may be able to discover each other in subsequent peer discovery bursts. If the peer discovery bursts are spaced apart every 8 seconds (i.e., one megafame), a discovery latency due to concurrent peer discovery transmission would be 8 seconds. However, when the silence interval 402 is used for peer discovery rather than sets of resources allocated every 8 seconds in each megaframe as discussed in FIG. 5, a discovery latency due to concurrent peer discovery transmission is equal to the delay between the silence intervals 402, which for the EV-DO silence interval is 54 seconds. A discovery latency of 54 seconds would be intolerable to users of the system. An exemplary structure of the peer discovery channel is provided infra that addresses the discovery latency issue related to conducting peer discovery in the EV-DO silence interval.

Figure 9:
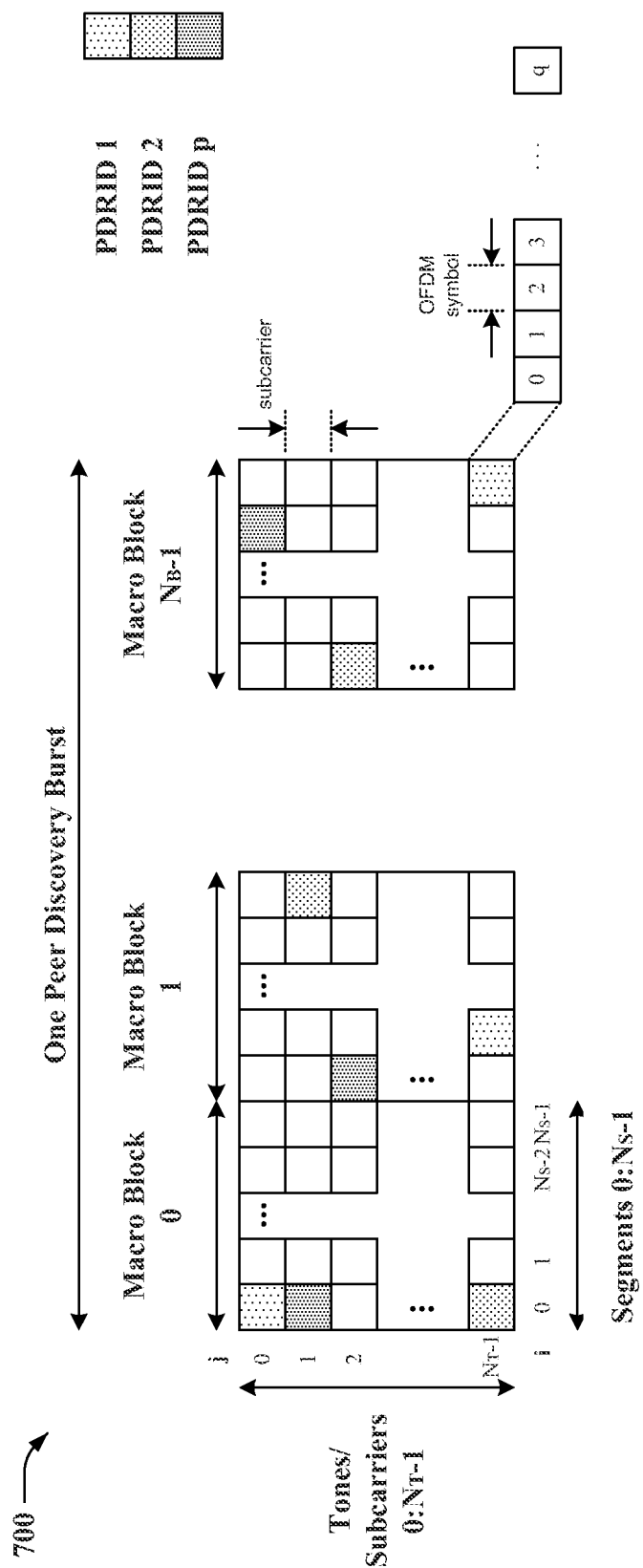
FIG. 9 is a diagram illustrating an exemplary structure of the peer discovery channel.

FIG. 9 is a diagram illustrating an exemplary structure of the peer discovery channel. As shown in FIG. 9, one peer discovery burst is split into $N_B$ macro blocks, where $N_B>1$. Each macro block has $N_T$ tones/subcarriers and $N_S$ segments. As such, each macro block has $N_T*N_S$ blocks. Each block includes a plurality of OFDM symbols at a particular subcarrier (shown as q resource elements). If a PDRID is associated with one block in each of the macro blocks, one peer discovery burst would support $N_T*N_S$ PDRIDs. The resources allocated to any particular PDRID are defined by the hopping pattern:

$$i(t) = \Sigma_{k=0}^{k=K} a_k * t^k \quad (1)$$

$j(t)$=any function of $(a_i,t)$ such that two PDRIDs with the same $i(t)$ do not map to the same $j(t)$, (2)

where the segment index i(t) satisfies the equation $0 \leq i(t) < N_S$, the tone/subcarrier index j(t) satisfies the equation $0 \leq j(t) < N_T$, t is the macro block index between 0 and $N_B-1$, K is an integer and is defined such that $N_S^{K-1} < N_T \leq N_S^K$, $a_k$ satisfies the equation $0 \leq a_k < N_S-1$ and is any representation of the PDRIDs that uniquely maps a PDRID to $a_0, a_1, \ldots, a_K$, and the sum and product in (1) are defined as the addition and multiplication operation within the Galois field $GF(N_S)$ if $N_S$ is a power of a prime number with $a_i$ and t mapped to elements of $GF(N_S)$, and in modulo arithmetic otherwise. Note that the total number of PDRIDs is $N_T*N_S$, which is less than or equal to $N_S^{K+1}$, but greater than $N_S^K$ according to the definition of K. If $N_S$ is a prime power, then for any two PDRIDs, the number of times a concurrent time resource is used is upper bounded by K.

When $N_T < N_S$, then K=1. When $N_T > N_S$, $K \geq 2$. When $N_S$ is a prime number and K=1, an exemplary hopping pattern is given by the following equations:

$$i(t) = \mod(jt+i, N_S) \quad (3)$$

$$j(t)=j, \quad (4)$$

where j=mod(PDRID,$N_T$) and i=(PDRID−j)/$N_T$. When $N_S$ is a prime number and K=2, an exemplary hopping pattern is given by the following equations:

$$i(t) = \mod\left(\text{floor}\left(\frac{j}{N_S}\right)*t^2 + \mod(j, N_S)*t + i, N_S\right) \quad (5)$$

$$j(t) = j, \quad (6)$$

where j=mod(PDRID,$N_T$) and i=(PDRID−j)/$N_T$. The tone/subcarrier index j(t) may be randomized over time to harness frequency diversity gain.

Figure 10:
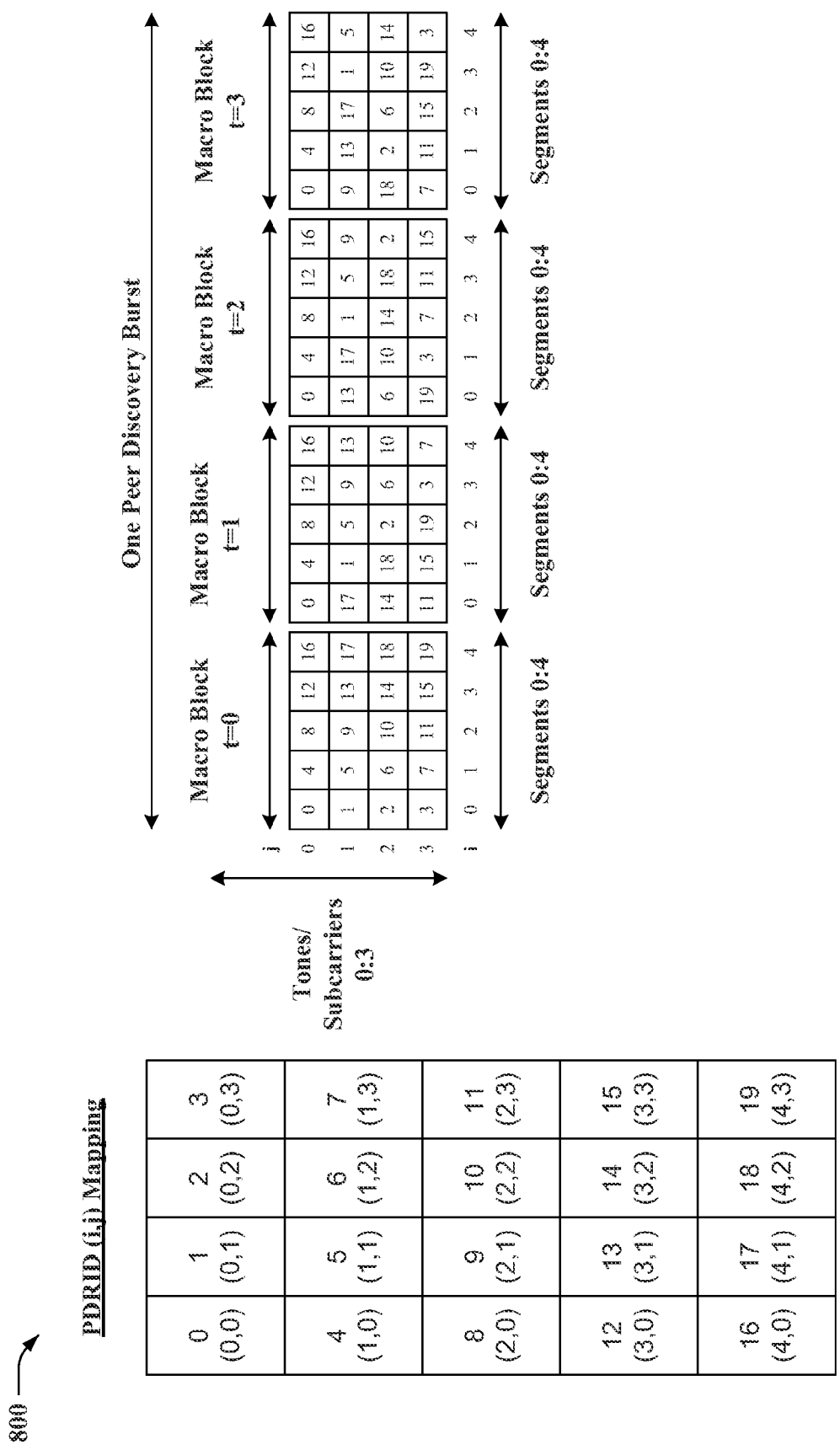
FIG. 10 is a diagram for illustrating an exemplary hopping pattern.

FIG. 10 is a diagram 800 for illustrating an exemplary hopping pattern. When K=1, an exemplary hopping pattern is provided by equations (3) and (4). If $N_T=4$ and $N_S=5$, the resources support 20 PDRIDs. Based on the equations j=mod (PDRID,$N_T$) and i=(PDRID−j)/$N_T$, each of the PDRIDs 0, 1, 2, . . . , 19 correspond to an (i,j) value as shown in the PDRID (i,j) mapping table. For example, PDRID 3 corresponds to value (0,3) and PDRID 18 corresponds to value (4,2). The values/PDRIDs map to coordinates i(t),j(t) as shown in FIG. 10.

As is apparent from FIG. 10, a wireless device splits the data into four data sets, as there are four macro blocks. A wireless device selects four different resources associated with a resource identifier based on a hopping pattern for sending each of the data sets within a set of resources of one peer discovery burst (i.e., one full set of transmissions). The selected four resources have a hopping pattern such that there is at least one resource of the four resources that is non-overlapping in time with resources associated with resource identifiers other than said resource identifier. For example, in the exemplary hopping pattern of FIG. 10, the PDRID 2 overlaps in time (i.e., is at the same segment) with PDRID 1 only once out of four resources. The same relationship is true for each of the other PDRIDs. As such, for this particular hopping pattern, there are three resources of the four resources that are non-overlapping in time with resources associated with resource identifiers other than said resource identifier. By providing some resources every peer discovery burst that are non-overlapping in time, peer discovery devices will be able to discover each other. For example, half-duplex wireless devices assigned PDRIDs 0, 1, 2, and 3 will not be able to receive peer discovery transmissions from each other in the $1^{st}$ macro block, but will be able to receive peer discovery transmissions from each other in the $2^{nd}$, $3^{rd}$, and $4^{th}$ macro blocks. A wireless device sends a number of data sets on an equal number of selected resources in an equal number of transmissions within the one full set of transmissions. For example, a wireless device with a particular PDRID may send a data set in each of the macro blocks or may send a data set in each of only a subset of the macro blocks.

Figure 11:
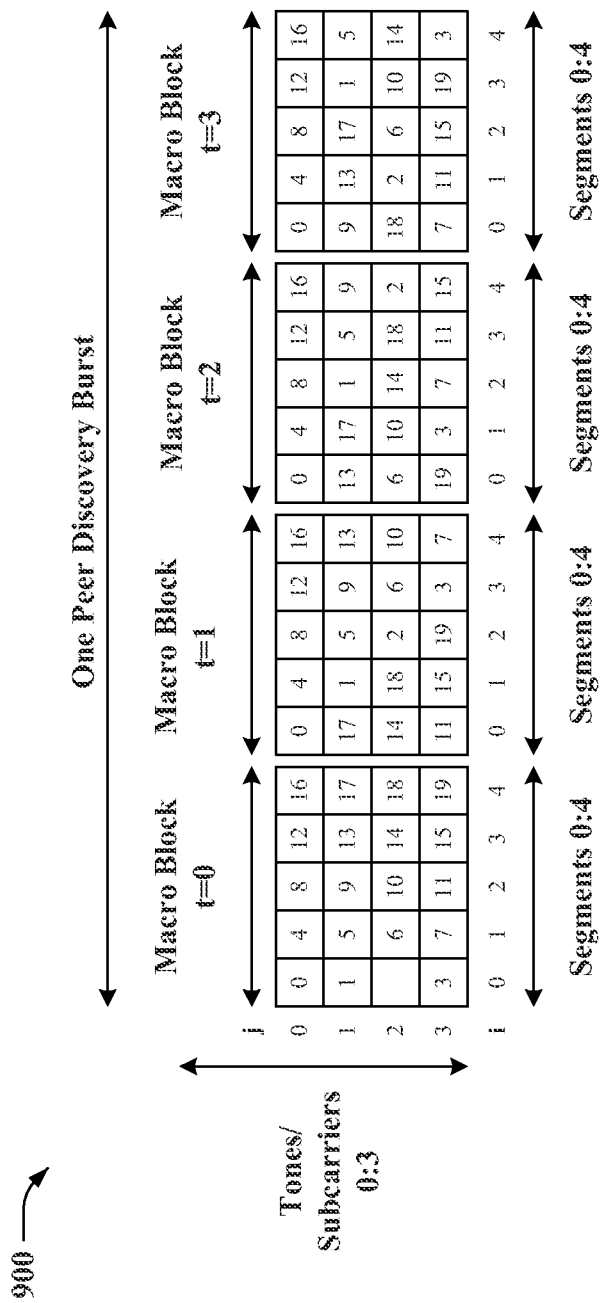
FIG. 11 is a diagram for illustrating an exemplary method.

FIG. 11 is a diagram 900 for illustrating an exemplary method. A wireless device may send a data set in each of only a subset of the macro blocks for a particular peer discovery burst. For example, for a particular peer discovery burst, the wireless device with the PDRID 2 may refrain from sending a data set on the resources within the $1^{st}$ macro block and listen for peer discovery signals sent in the $1^{st}$ macro block. The wireless device determines an energy on each of the resources. Based on the determined energy, the wireless device can select a new PDRID if the new PDRID has a lower determined energy than the PDRID 2. In addition, the wireless device can detect PDRID collisions. The PDRID collision may be caused by another wireless device using the same PDRID or another wireless device transmitting on the resource associated with the PDRID in order to induce collision detection. Because of the half duplex constraint, two wireless devices that happen to be using the same PDRID (e.g., due to mobility or simultaneous PDRID selection) would have no way of recovering from the collision without listening during some subset of their allocated resources. As such, the wireless device can listen rather than transmit on its allocated resource, such as in the $1^{st}$ macro block, and monitor that resource for PDRID collisions. The allocated resource on which the wireless device listens may be selected randomly based on a unique device identifier and may be selected on a slow time scale (e.g., once every 4 minutes). A PDRID collision may be defined with respect to the energy on the particular resource or with respect to a comparison of energies on other resources. For example, the wireless device may detect a PDRID collision if the energy that the wireless device receives on its own PDRID is greater than 10% of the energies received on all PDRIDs.

FIG. 12 is a table 1000 illustrating exemplary parameters for the exemplary structure of the peer discovery channel. Designs D1 and D2 each have only one macro block per peer discovery burst. Designs D3, D4, and D5 have a plurality of macro blocks per peer discovery burst. The designs include various fast Fourier transform (FFT) sizes and modulation and coding schemes. The designs D3, D4, and D5 perform better than designs D1 and D2, which are hampered by the half duplex constraint.

Figure 13:
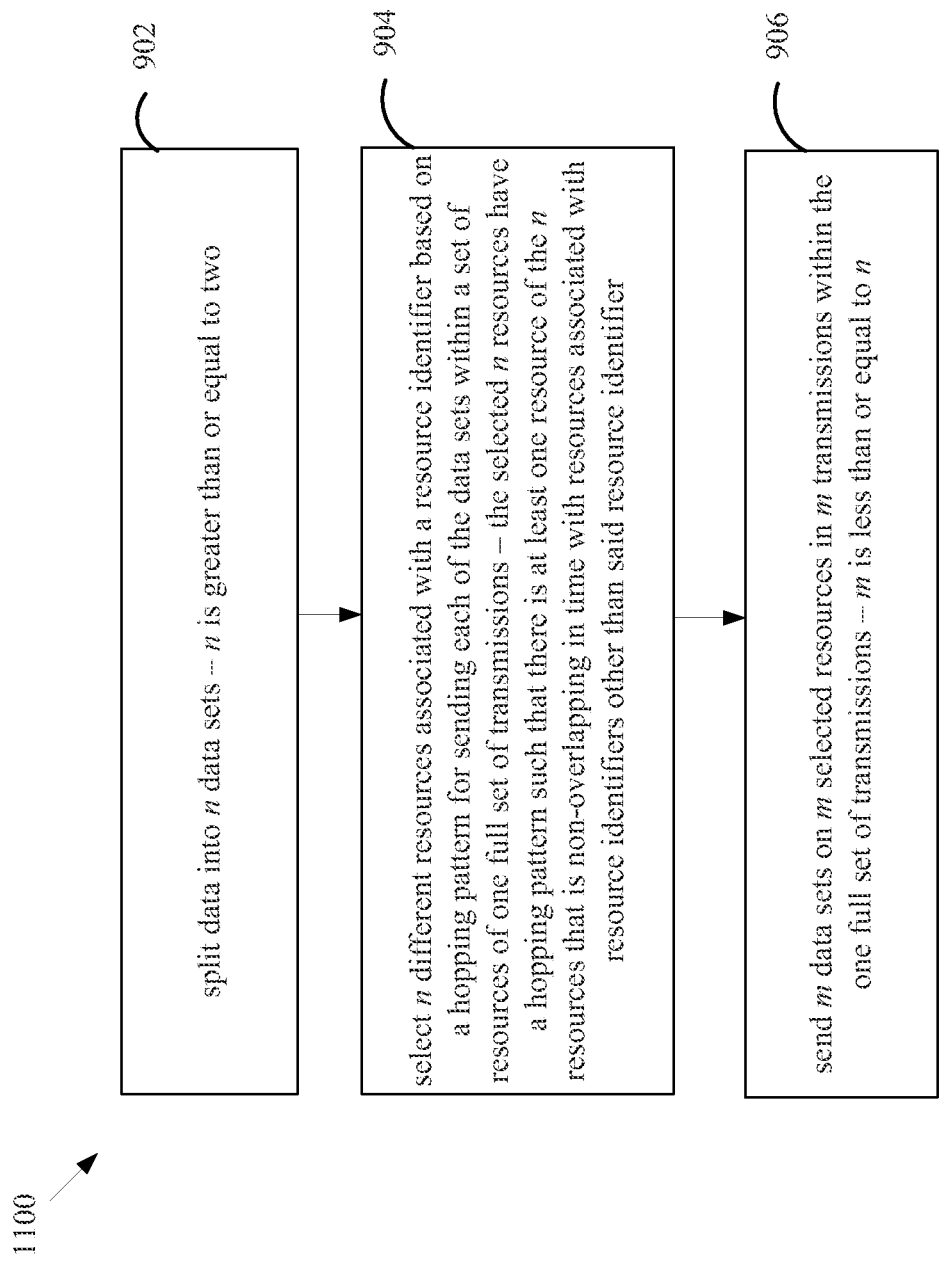
FIG. 13 is a flow chart of a method of wireless communication.

FIG. 13 is a flow chart 1100 of a method of wireless communication. The method is performed by a wireless device. The wireless device splits data into n data sets, where n is greater than or equal to two (902). In addition, the wireless device selects n different resources associated with a resource identifier based on a hopping pattern for sending each of the data sets within a set of resources of one full set of transmissions (904). The selected n resources have a hopping pattern such that there is at least one resource of the n resources that is non-overlapping in time with resources associated with resource identifiers other than said resource identifier (904). Furthermore, the wireless device sends m data sets on m selected resources in m transmissions within the one full set of transmissions, where m is less than or equal to n (906). For example, if a peer discovery burst includes $N_B$ macro blocks, a wireless device may split data into $N_B$ data sets, select $N_B$ different blocks associated with a PDRID based on a hopping pattern, and send a data set on each block of a subset of the $N_B$ blocks. The subset includes $N_B$ or fewer blocks.

In one configuration, the data are peer discovery data, the transmissions are peer discovery transmissions, and the resource identifiers are peer discovery resource identifiers. The selected n resources may have a hopping pattern such that there are n−K resources of the n resources that are non-overlapping in time with resources associated with resource identifiers other than said resource identifier, where K is an integer greater an than or equal to one. The value K may be defined such that $N_S^{K-1} < N_T \leq N_S^K$, where $N_S$ is a number of segments and $N_T$ is a number of subcarriers. The value $N_S$ may be equal to $p^m$, where p is a prime number and m is a positive integer.

Figure 14:
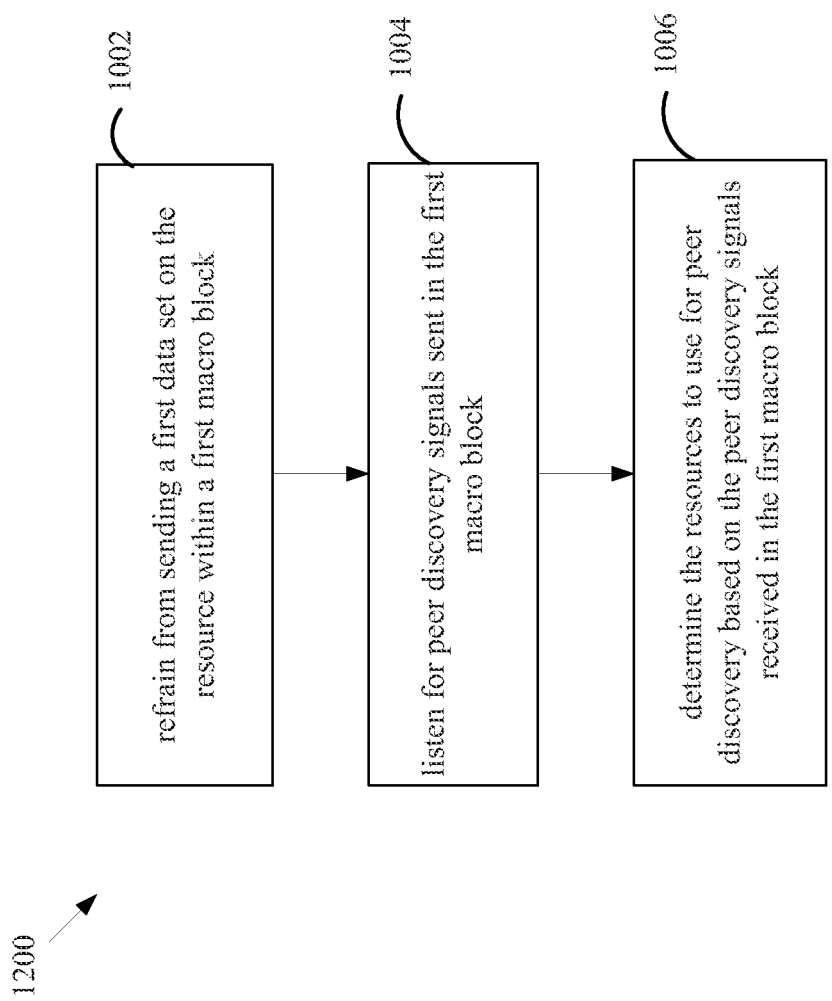
FIG. 14 is a flow chart of another method of wireless communication.

FIG. 14 is a flow chart 1200 of another method of wireless communication. In one configuration, each of the n resources is selected within a different macro block of n macro blocks within resources dedicated for the one full set of peer discovery transmissions, and each of the resources include a plurality of OFDM symbols. In such a configuration, m equals n−1 and the wireless device sends the n−1 data sets on the resources within $2^{nd}$ through $n^{th}$ macro blocks. In such a configuration, the wireless device refrains from sending a first data set on the resource within a first macro block (1002) and listens for peer discovery signals sent in the first macro block (1004). The wireless device may also determine the resources to use for peer discovery based on the peer discovery signals received in the first macro block (1006).

Figure 15:
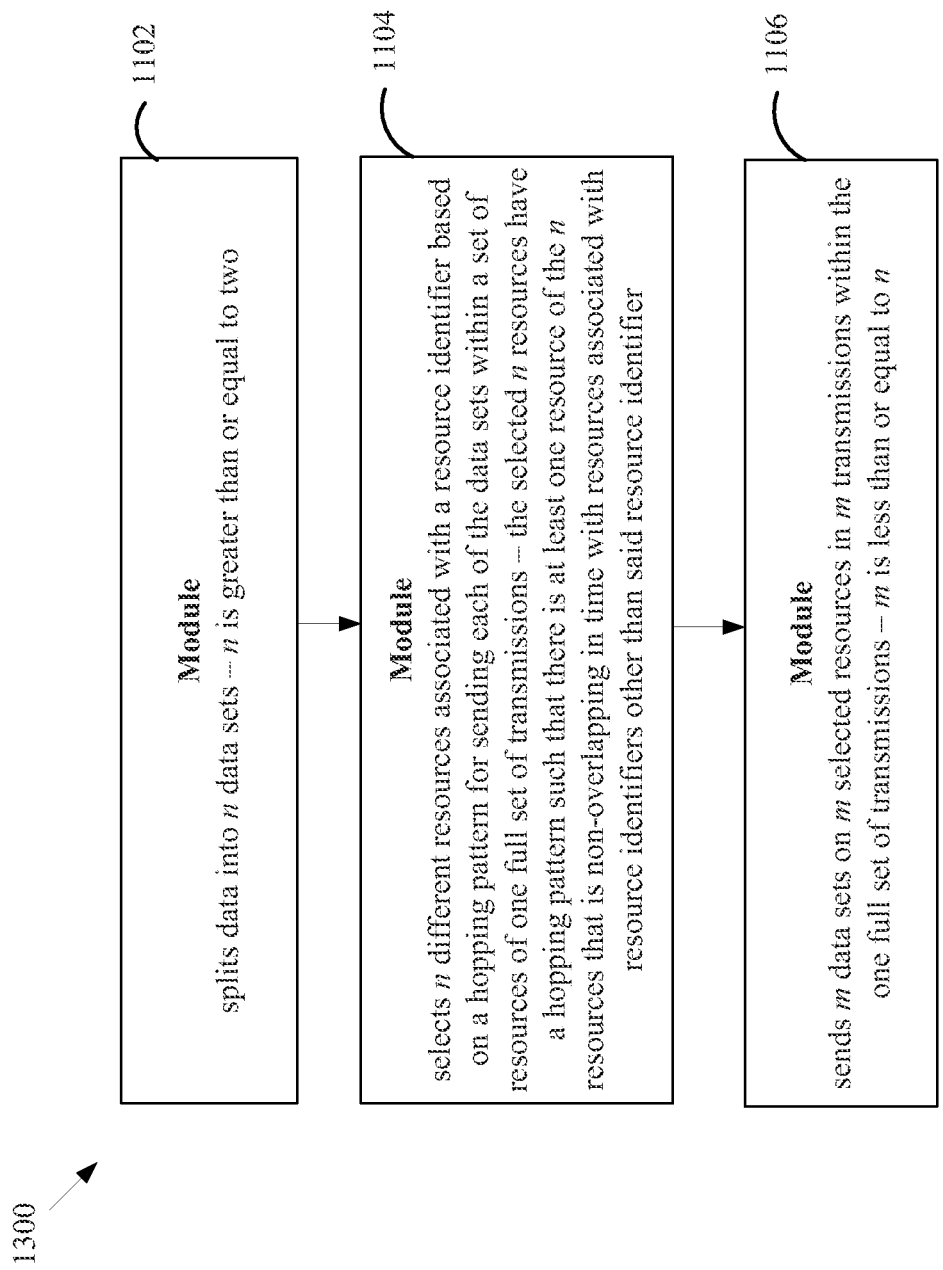
FIG. 15 is a conceptual block diagram illustrating the functionality of an exemplary apparatus.

FIG. 15 is a conceptual block diagram 1300 illustrating the functionality of an exemplary apparatus 100. The exemplary apparatus 100, which may be a wireless device, includes a module 1102 that splits data into n data sets, where n is greater than or equal to two. The apparatus 100 further includes a module 1104 that selects n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. The apparatus 100 further includes a module 1106 that sends m data sets on m selected resources in m transmissions within the one full set of transmissions, where m is less than or equal to n. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication is a wireless device and includes means for splitting data into n data sets, where n is greater than or equal to two. The apparatus 100 further includes means for selecting n different resources associated with a resource identifier based on a hopping pattern for sending each of the data sets within a set of resources of one full set of transmissions. The selected n resources have a hopping pattern such that there is at least one resource of the n resources that is non-overlapping in time with resources associated with resource identifiers other than said resource identifier. The apparatus 100 further includes means for sending m data sets on m selected resources in m transmissions within the one full set of transmissions, where m is less than or equal to n. The apparatus 100 may further include means for refraining from sending a first data set on the resource within a first macro block and means for listening for peer discovery signals sent in the first macro block. The apparatus 100 may further include means for determining the resources to use for peer discovery based on the peer discovery signals received in the first macro block. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   splitting data into n data sets, n being greater than or equal to two;
   selecting n different resources associated with a resource identifier based on a hopping pattern for sending each of the data sets within a set of resources of one full set of transmissions, the selected n resources having a hopping pattern such that there is at least one resource of the n resources that is non-overlapping in time with resources associated with resource identifiers other than said resource identifier; and
   sending m data sets on m selected resources in m transmissions within the one full set of transmissions, m being less than or equal to n wherein the data is peer discovery data, the transmissions are peer discovery transmissions, and the resource identifiers are peer discovery resource identifiers.

2. The method of claim 1, wherein the selected n resources have a hopping pattern such that there are n−K resources of the n resources that are non-overlapping in time with resources associated with resource identifiers other than said resource identifier, K being an integer greater an than or equal to one.

3. The method of claim 2, wherein K is defined such that $N_S^{K-1} < N_T \leq N_S^K$, where $N_S$ is a number of segments and $N_T$ is a number of subcarriers.

4. The method of claim 3, wherein $N_S$ is equal to $p^m$, p being a prime number and m being a positive integer.

5. The method of claim 1, wherein each of the n resources is selected within a different macro block of n macro blocks within resources dedicated for the one full set of peer discovery transmissions, and each of the resources comprises a plurality of orthogonal frequency-division multiplexing (OFDM) symbols.

6. The method of claim 5, wherein m equals n−1 and the sending comprises sending the n−1 data sets on the resources within second through $n^{th}$ macro blocks, the method further comprising:
   refraining from sending a first data set on the resource within a first macro block; and
   listening for peer discovery signals sent in the first macro block.

7. The method of claim 6, further comprising determining the resources to use for peer discovery based on the peer discovery signals received in the first macro block.

8. An apparatus for wireless communication, comprising:
   means for splitting data into n data sets, n being greater than or equal to two;
   means for selecting n different resources associated with a resource identifier based on a hopping pattern for sending each of the data sets within a set of resources of one full set of transmissions, the selected n resources having a hopping pattern such that there is at least one resource of the n resources that is non-overlapping in time with resources associated with resource identifiers other than said resource identifier; and
   means for sending m data sets on m selected resources in m transmissions within the one full set of transmissions, m being less than or equal to n wherein the data is peer discovery data, the transmissions are peer discovery transmissions, and the resource identifiers are peer discovery resource identifiers.

9. The apparatus of claim 8, wherein the selected n resources have a hopping pattern such that there are n−K resources of the n resources that are non-overlapping in time with resources associated with resource identifiers other than said resource identifier, K being an integer greater an than or equal to one.

10. The apparatus of claim 9, wherein K is defined such that $N_S^{K-1} < N_T \leq N_S^K$, where $N_S$ is a number of segments and $N_T$ is a number of subcarriers.

11. The apparatus of claim 10, wherein $N_S$ is equal to $p^m$, p being a prime number and m being a positive integer.

12. The apparatus of claim 8, wherein each of the n resources is selected within a different macro block of n macro blocks within resources dedicated for the one full set of peer discovery transmissions, and each of the resources comprises a plurality of orthogonal frequency-division multiplexing (OFDM) symbols.

13. The apparatus of claim 12, wherein m equals n−1 and the means for sending sends the n−1 data sets on the resources within second through $n^{th}$ macro blocks, the apparatus further comprising:
   means for refraining from sending a first data set on the resource within a first macro block; and
   means for listening for peer discovery signals sent in the first macro block.

14. The apparatus of claim 13, further comprising means for determining the resources to use for peer discovery based on the peer discovery signals received in the first macro block.

15. A non-transitory computer-readable medium comprising code for:
   splitting data into n data sets, n being greater than or equal to two;
   selecting n different resources associated with a resource identifier based on a hopping pattern for sending each of the data sets within a set of resources of one full set of transmissions, the selected n resources having a hopping pattern such that there is at least one resource of the n resources that is non-overlapping in time with resources associated with resource identifiers other than said resource identifier; and
   sending m data sets on m selected resources in m transmissions within the one full set of transmissions, m being less than or equal to wherein the data is peer discovery data, the transmissions are peer discovery transmissions, and the resource identifiers are peer discovery resource identifiers.

16. The non-transitory computer-readable medium of claim 15, wherein the selected n resources have a hopping pattern such that there are n−K resources of the n resources that are non-overlapping in time with resources associated with resource identifiers other than said resource identifier, K being an integer greater an than or equal to one.

17. The non-transitory computer-readable medium of claim 16, wherein K is defined such that $N_S^{K-1} < N_T \leq N_S^K$, where $N_S$ is a number of segments and $N_T$ is a number of subcarriers.

18. The non-transitory computer-readable medium of claim 17, wherein $N_S$ is equal to $p^m$, p being a prime number and m being a positive integer.

19. The non-transitory computer-readable medium of claim 15, wherein each of the n resources is selected within a different macro block of n macro blocks within resources dedicated for the one full set of peer discovery transmissions, and each of the resources comprises a plurality of orthogonal frequency-division multiplexing (OFDM) symbols.

20. The non-transitory computer-readable medium of claim 19, wherein m equals n−1 and the code for sending sends the n−1 data sets on the resources within second through $n^{th}$ macro blocks, wherein the computer-readable medium further comprises code for:

refraining from sending a first data set on the resource within a first macro block; and listening for peer discovery signals sent in the first macro block.

21. The non-transitory computer-readable medium of claim 20, wherein the computer-readable medium further comprises code for determining the resources to use for peer discovery based on the peer discovery signals received in the first macro block.

22. An apparatus for wireless communication, comprising:
a processing system configured to:
split data into n data sets, n being greater than or equal to two;
select n different resources associated with a resource identifier based on a hopping pattern for sending each of the data sets within a set of resources of one full set of transmissions, the selected n resources having a hopping pattern such that there is at least one resource of the n resources that is non-overlapping in time with resources associated with resource identifiers other than said resource identifier; and
send m data sets on m selected resources in m transmissions within the one full set of transmissions, m being less than or equal to n wherein the data is peer discovery data, the transmissions are peer discovery transmissions, and the resource identifiers are peer discovery resource identifiers.

23. The apparatus of claim 22, wherein the selected n resources have a hopping pattern such that there are n–K resources of the n resources that are non-overlapping in time with resources associated with resource identifiers other than said resource identifier, K being an integer greater an than or equal to one.

24. The apparatus of claim 23, wherein K is defined such that $N_S^{K-1} < N_T \leq N_S^K$, where $N_S$ is a number of segments and $N_T$ is a number of subcarriers.

25. The apparatus of claim 24, wherein $N_S$ is equal to $p^m$, p being a prime number and m being a positive integer.

26. The apparatus of claim 22, wherein each of the n resources is selected within a different macro block of n macro blocks within resources dedicated for the one full set of peer discovery transmissions, and each of the resources comprises a plurality of orthogonal frequency-division multiplexing (OFDM) symbols.

27. The apparatus of claim 26, wherein m equals n–1, the processing system is configured to send the n–1 data sets on the resources within second through $n^{th}$ macro blocks, and the processing system is configured to:
refrain from sending a first data set on the resource within a first macro block; and
listen for peer discovery signals sent in the first macro block.

28. The apparatus of claim 27, wherein the processing system is further configured to determine the resources to use for peer discovery based on the peer discovery signals received in the first macro block.

* * * * *